(12) United States Patent
Dong et al.

(10) Patent No.: US 8,226,405 B2
(45) Date of Patent: Jul. 24, 2012

(54) FULL TIME REGENERATIVE TYPE SINGLE RADIANT TUBE BURNER

(75) Inventors: Sang Keun Dong, Daejeon (KR); Je Bok Yang, Gyeryong-si (KR); Eun Kyeong Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 340 days.

(21) Appl. No.: 12/693,980

(22) Filed: Jan. 26, 2010

(65) Prior Publication Data

US 2011/0056487 A1   Mar. 10, 2011

(30) Foreign Application Priority Data

Sep. 10, 2009  (KR) .................. 10-2009-0085381

(51) Int. Cl.
   *F23D 14/66* (2006.01)
(52) U.S. Cl. .......... 431/215; 431/11; 431/243; 431/247; 431/248; 126/91 A
(58) Field of Classification Search ................ 126/91 A; 431/215, 243, 247, 248, 11
See application file for complete search history.

(56) References Cited

U.S. PATENT DOCUMENTS

| | | | | |
|---|---|---|---|---|
| 5,161,968 A | * | 11/1992 | Nutcher et al. | 432/179 |
| 5,184,951 A | * | 2/1993 | Nutcher et al. | 432/28 |
| 5,570,679 A | * | 11/1996 | Wunning | 126/91 A |
| 5,628,629 A | * | 5/1997 | Mitani et al. | 432/180 |
| 5,848,885 A | * | 12/1998 | Tanaka et al. | 431/215 |
| 5,997,279 A | * | 12/1999 | Hosome et al. | 431/76 |
| 6,000,929 A | * | 12/1999 | Izumo et al. | 431/7 |
| 6,033,208 A | * | 3/2000 | Wunning | 431/215 |
| 6,039,927 A | * | 3/2000 | Greco | 422/175 |
| 6,042,371 A | * | 3/2000 | Mitani et al. | 432/179 |
| 7,766,025 B2 | * | 8/2010 | Greco | 137/1 |
| 2009/0226853 A1 | * | 9/2009 | Dong et al. | 431/115 |
| 2010/0119983 A1 | * | 5/2010 | Wunning et al. | 431/11 |

FOREIGN PATENT DOCUMENTS

| | | |
|---|---|---|
| KR | 10-0583819 B1 | 5/2006 |
| KR | 10-0583820 B1 | 5/2006 |
| KR | 10-0675190 B1 | 1/2007 |

OTHER PUBLICATIONS

KIPO Notice of Allowance for Korean Patent Application No. 10-2009-0085381 which corresponds to U.S. Appl. No. 12/693,980.

* cited by examiner

*Primary Examiner* — Kenneth Rinehart
*Assistant Examiner* — Jorge Pereiro
(74) *Attorney, Agent, or Firm* — LRK Patent Law Firm

(57) ABSTRACT

The present invention relates to a full time regenerative type single radiant tube burner. The full time regenerative type single radiant tube burner includes a radiant tube type burner; a regenerating unit that regenerates exhaust gas heat generated from the burner and is used for preheating the intake combustion air; and an intake and exhaust switching device that passes the intake air and the exhaust gas to the regenerating unit and heat-exchanges them and simultaneously progresses the intake and exhaust processes of the burner to perform the full time combustion.

The present invention according to the above configuration operation can perform the full time combustion using the single radiant tube burner to maximize the combustion efficiency, thereby improve the energy efficiency, while the present invention makes the structure of the intake and exhaust switching device 300 simple, can compactly design the burner by mounting the regenerating unit 200, which is integrated with the intake and exhaust switching device, to surround the circumference of the burner body 110 and can manufacture the burner at a small size, such that it can be applied to various environments without limiting the installation space.

10 Claims, 8 Drawing Sheets

Prior Art

FIG. 1

Prior Art

FIG. 2

Prior Art

FULL TIME REGENERATIVE TYPE SINGLE RADIANT TUBE BURNER

BACKGROUND OF THE INVENTION

1. Field of the Invention

The present invention relates to a single radiant tube burner, and more specifically, to a full time regenerative type single radiant tube burner.

2. Description of the Related Art

Generally, a combustor such as a burner, etc., is a device that combusts fuel and air that are injected at an appropriate mixing ratio, transfers heat energy generated upon combusting to other media to melt the media or change the temperature of the media, and is used to convert heat energy into electric or kinetic energy.

The combustor or the burner, etc., should implement combustion reaction in an industrial furnace and the optimization of electro thermal characteristic and achieve the optimal temperature in the industrial furnace.

In addition, the ideal combustor or burner, etc., should be easy to handle and be safe, be in a work environment that is harmless to a person, and be maintained at high efficiency while minimizing emissions of heat, gas, fluid, pollutant, etc.

In other words, it is a major object to develop the combustor or the burner, etc., which can be operated at high efficiency and acquire flame stabilization while minimizing the amount of NOx (nitrogen oxide) emitted upon combusting, which are challenges to be pursued in the future.

However, these are ideal challenges and are still not completely solved.

In other words, the combustor in the related art excessively emits the amount of NOx (nitrogen oxide) upon combusting, which is a level of a risk that is harmful to an environment or a human body.

Therefore, many researches on the development of the combustor or the burner, etc., for generating the low NOx (nitrogen oxide) have been long performed at home and abroad and the non-equilibrium combustion method such as a multi-stage combustion method or a lean/rich combustion method has been mainly researched.

Further, there is an exhaust gas re-circulating method that reduces NOx by lowering the flame maximum temperature the combustion exhaust gas by using the internal circulation manner or the external circulation manner and there is a technology that uses a selective catalytic reduction (SCR) apparatus and a selective non-catalytic reduction (SNCR) apparatus as a post-processing method.

In addition, several attempts, such as a technology of using a reburning effect by the stepwise supply of fuel injection, the temperature uniformity by surface/catalyst combustion, etc., have been performed, which is being continuously developed today.

However, it is not easy to develop the energy saving type low NOx (nitrogen oxide) combustor that has the stabilization of flame, does not almost generate the unburned carbon, and has the industrial furnace system of high heat efficiency.

The reason is that the flame temperature to reduce the NOx is lowered and thus the reduction of the energy efficiency is evitable.

1) The non-equilibrium combustion method and 2) the exhaust gas re-circulating combustion method, which are related to the present invention, among the existing researched and developed NOx (nitrogen oxide) suppressing methods will be sequentially described below.

1) Non-Equilibrium Combustion Method

As the non-equilibrium combustion method, there are an air 2 state supply combustion method and a bias combustion method. The methods are the same in that they control the supply ratio of air for combusting to suppress the generation of the NOx (nitrogen oxide).

Reviewing the generation ratio of the NOx (nitrogen oxide) according to the combustion, a part where the generating point is highest is generated in a mixing ratio having excellent combustion efficiency by a predetermined mixing between fuel and air.

In other words, the heat efficiency is highest but the generation amount of the NOx (nitrogen oxide) reaches the highest point, at the mixing ratio, which is antinomic.

Therefore, the non-equilibrium combustion method supplies air to be out of the mixing ratio between fuel and air to maximally generate the NOx (nitrogen oxide).

Describing in more detail, the air 2 stage supply combustion method is a combustion method that separates and supplies air at primary and secondary steps.

The air 2 stage supply combustion method is a method that at a primary step, supplies air, at smaller amount than a mixing amount of air where the generation amount of the NOx (nitrogen oxide) reaches the highest point and at secondary step, supplies a excessive amount of air to avoid the highest point where the NOx (nitrogen oxide) is wholly generated.

Of course, a method that supplies an excessive amount of air at a primary step and supplies a small amount at a secondary step can be obtained the same object.

On the other hand, the bias combustion method is a method that implements two areas, that is, a small amount of air ratio area and a high amount of air ratio area to be adjacent to each other.

In other words, there may be, for example, a bias tip, etc., that largely separates one burner nozzle in the type operated at a generally appropriate air ratio and small separates the other one burner nozzle by combusting one of two burners at a low air ratio and combusting the other burner at high air ratio.

As a result, the method makes the air distribution uneven to avoid the peak value the generation of the NOx (nitrogen oxide).

2) Exhaust Gas Re-Circulating Method

The exhaust gas re-circulating method is a method for suppressing the generated NOx that re-circulates the gas combusted once and combusts again, to increase the volume of the combustion gas and lower the temperature of flame.

At this time, when the exhaust gas is re-circulated, the exhaust gas can be circulated in the air for combustion but can be re-circulated in the supplied fuel.

However, as the exhaust gas re-circulating method, there are an internal type and an external type. The external type is a type that some of the combusted and emitted exhaust gas is mixed in an injection fuel pipe or an air pipe for combustion and supplies it to the combustor again.

On the other hand, the internal type is a type that re-circulates the exhaust gas in the furnace.

Therefore, the external type and the internal type reduces the injection amount of air for combustion to re-circulate the exhaust gas by air for recombustion.

Of course, this reduces the flame temperature and thus, the generation of the NOx (nitrogen oxide) is reduced.

As a result, 1) the non-equilibrium combustion method or 2) the exhaust gas re-circulating method controls the injection amount of air that is necessary for combustion to avoid the mixing ratio at which the generation of the NOx (nitrogen oxide) is a peak value.

It can be considered that the method for suppressing the generation of the NOx (nitrogen oxide) is already emerged. However, when the method is applied to the combustor or the burner, etc., there is still the problem of the improvement of heat efficiency.

Therefore, a method for simultaneously obtaining the effect of suppressing the nitrogen oxide by applying the exhaust gas re-circulating method to the burner, etc., has been sought.

In other words, in order to prevent the high-temperature exhaust gas generated by the flame from being uselessly emitted to the air, it re-circulates the exhaust gas but collects the heat energy of the exhaust gas in a regenerator to be reused.

The burner that is in the high-temperature state by accumulating the heat energy in the regenerator can be combusted in the atmosphere of low oxygen concentration, such that it can suppress the generation of the NOx (nitrogen oxide) while naturally avoiding the peak point.

Further, the industrial furnace, which does not perform the existing regeneration, is partitioned into a high-temperature area and a low-temperature area when flame is emitted from the burner.

In other words, the high-temperature and clear flame zone locally exists in some areas.

On the other hand, the burner, which always maintains the high-temperature state due to the regeneration, is not partitioned into the high-temperature area and the low-temperature area when flame is emitted and long forms the flame and is combusted in the state where the flame temperature is uniform to some degree.

This is extended until it reaches the non-flame to suppress the generation of the NOx (nitrogen oxide) and obtains the effect that can effectively manage the wasted heat energy.

As described above, the problem of the embodiment (burner) will be described by reviewing the burner that regenerates and reuses the heat energy in the burner by applying the exhaust gas re-circulating method.

Figure 1:
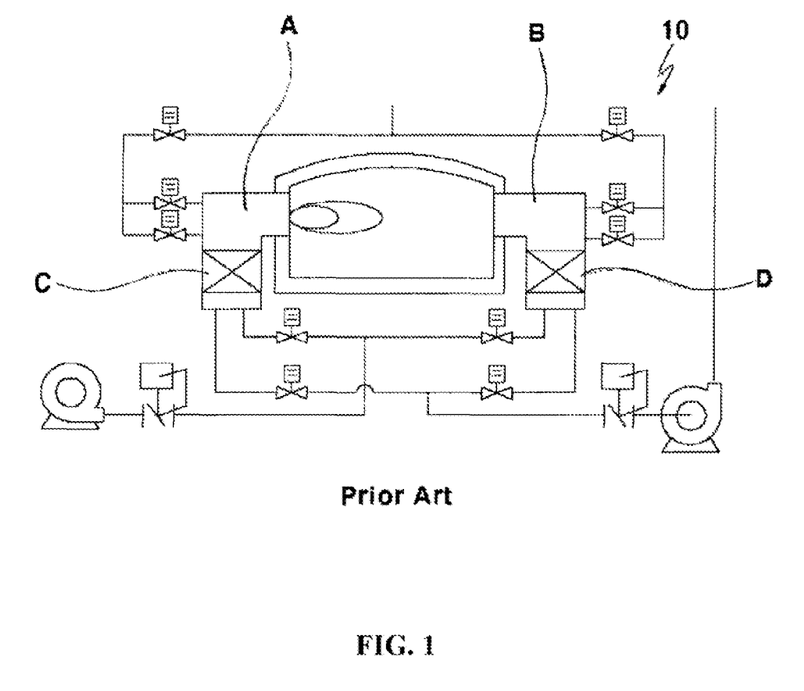
FIG. 1 is a system diagram showing a twin regenerative type burner system among regenerative combustion systems in the related art.

First, there is a twin regenerative type burner system 10 where combustors A and B such as a burner, etc., for combustion are installed to be opposite left and right, as shown in FIG. 1.

In other words, the two combustors A and B, which faces each other, are provided with separate regenerators C and D.

Therefore, when the combustor A emits firepower and emits the high-temperature exhaust gas, waste heat energy is accumulated in a regenerator D that is attached to the combustor B.

This state is maintained for about 20 to 80 seconds and then, a regenerator C, which is attached to the combustor A facing the combustor B that emits firepower accumulates heat.

In other words, the combustors are alternately operated and when one combustor emits firepower, the other accumulates heat energy.

Figure 2:
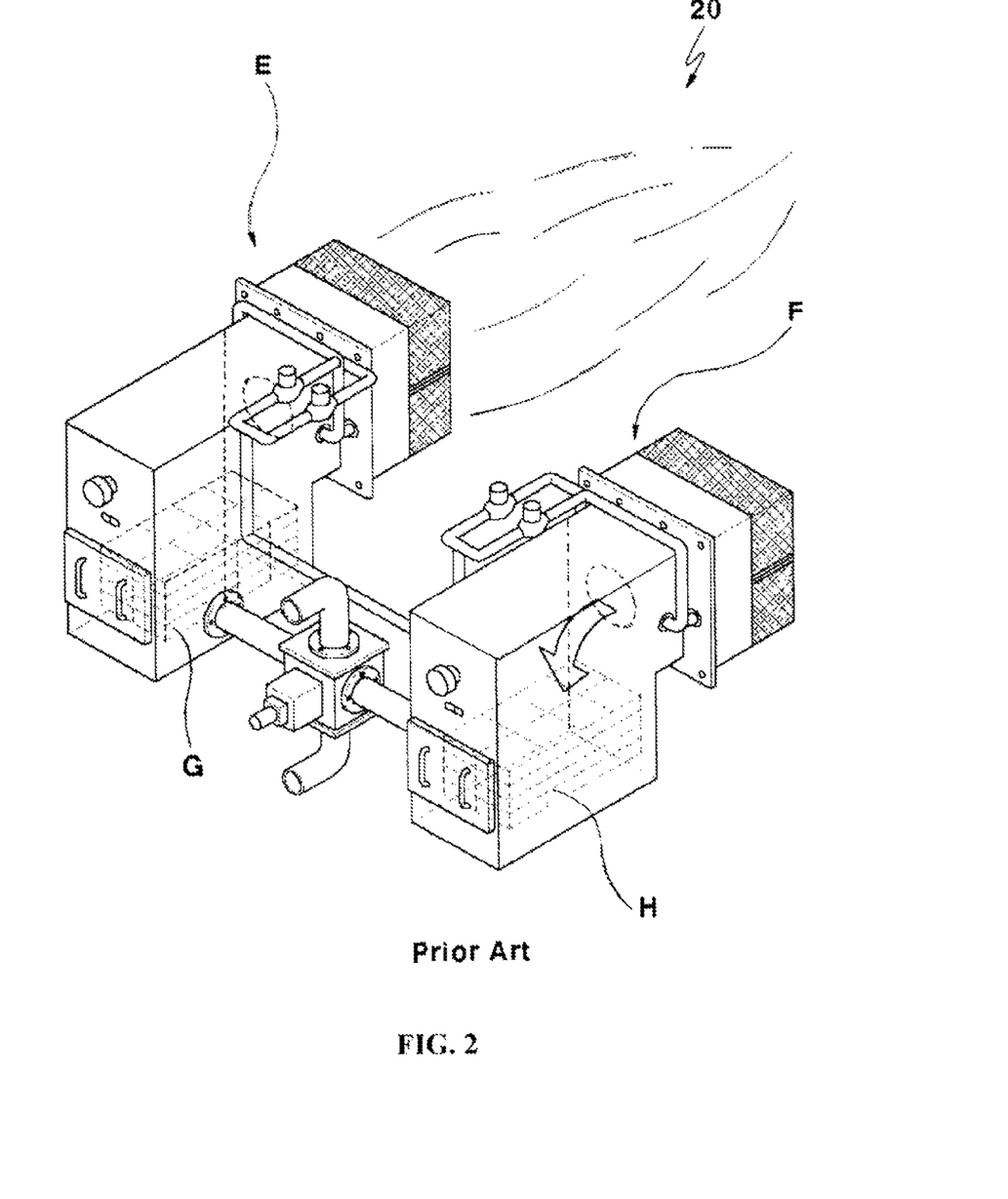
FIG. 2 is a perspective view showing a honey comb type regenerative combustion burner system in the related art.

Second, FIG. 2 shows a honey comb type regenerative combustion system 20 that is used for the same purpose as the above-mentioned twin regenerative burner system, wherein the honey comb type regenerative combustion system 20 has combustors E and F that are installed to be parallel left and right to emit firepower and accumulates the emission heat of the exhaust gas in regenerators G and H.

Figure 3:
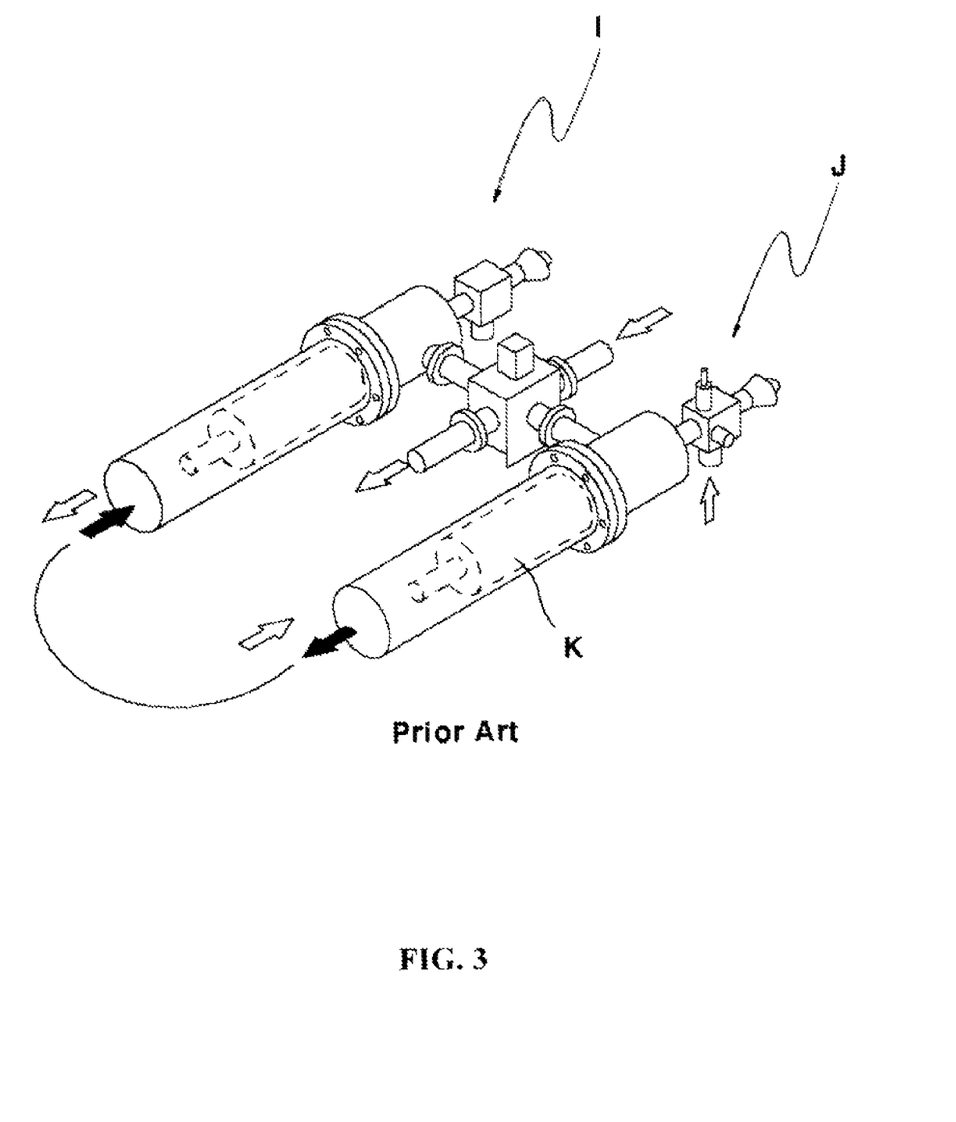
FIG. 3 is a perspective view showing a radiant tube type regenerative burner system in the related art.

Third, FIG. 3 shows a radiant tube type regenerative burner system that is used for the same purpose as the above-mentioned burner system, wherein the radiant tube type regenerative burner system has the combustors I and J such as the burner for combustion that are installed to be opposite to both ends of the radiant tube and have the regenerative body therein.

In this system, when the combustor I emits firepower and emits the high-temperature exhaust gas, the heat energy of the high-temperature exhaust gas, which is transferred through the radiant tube is accumulated in the regenerator D included in the combustor J.

This state is maintained for a predetermined time and then, when the combustor B emits firepower, the combustor I opposite thereto accumulates the heat energy.

In other words, the combustors are alternately operated and when one combustor emits firepower, the other accumulates heat energy.

However, the regenerative combustor necessarily needs two combustors and therefore, the manufacturing cost thereof is increased.

The combustor less than 1000 KW, which has a small combustion amount, is difficult to apply since the application cost of the system is greatly increased as compared with combustion amount In addition, it is difficult to install the burner in the combustion furnace having a narrow installation space.

In addition, the twin regenerative type burner system, which should be installed in two, the honey comb type regenerative combustion system, and the radiant tube type system have a large volume, such that they has a spatial restriction.

In other words, it is difficult to apply to a heat treatment furnace or a chemical reaction furnace such as a carburizing furnace that the maximum size and number of the burner are limited.

SUMMARY OF THE INVENTION

The present invention proposes to solve the problem in the related art. It is an object of the present invention to provide a full time regenerative type single radiant tube burner that can be compactly designed by a configuration that an intake and exhaust switching device having a simple structure, a regenerating unit, and a burner body are integrated In order to achieve the above object, the present invention includes a radiant tube type burner; a regenerating unit that regenerates exhaust gas heat generated from the burner and is used for preheating the intake combustion air; and an intake and exhaust switching device that passes the intake air and the exhaust gas to the regenerating unit and heat-exchanges them and simultaneously progresses the intake and exhaust processes of the burner to perform the full time combustion, wherein the intake and exhaust switching device includes: a first driver that supplies external injection air to a first regenerating chamber or discharges the exhaust gas heat-exchanged in the first regenerating chamber to the outside; a second driver that supplies the external injection air to a second regenerating chamber or discharges the exhaust gas heat-exchanged in the second regenerating chamber to the outside; a third driver that supplies the intake air preheated in the first regenerating chamber to the burner side or supplies the exhaust gas combusted in the burner to the first regenerating chamber; and a fourth driver that supplies the intake air preheated in the second regenerating chamber to the burner side or supplies the exhaust gas combusted in the burner to the second regenerating chamber.

Herein, the regenerating unit includes the first regenerating chamber and the second regenerating chamber having an independent channel that is provided at both sides of the burner.

At least one of the first driver, the second driver, the third driver, and the fourth driver includes: a valve body that has a three-way channel; a variable channel that is installed at the center of the valve body and optionally interrupts or change the internal channel; and an actuator that shaft-connects the variable channel to be rotatably operated.

The present invention according to the above configuration can perform the full time combustion using the single radiant tube burner, thereby making it possible to maximize the combustion efficiency and improve the energy efficiency.

In addition, the present invention makes the structure of the intake and exhaust switching device simple, can compactly design the burner by mounting the regenerating unit, which is integrated with the intake and exhaust switching device, to surround the circumference of the burner body, and can manufacture the burner at a small size, such that it can be applied to various environments without limiting the installation space.

DETAILED DESCRIPTION OF THE EMBODIMENTS

Hereinafter, a preferred embodiment of the present invention is described in detail with reference to the accompanying drawings.

Figure 4:
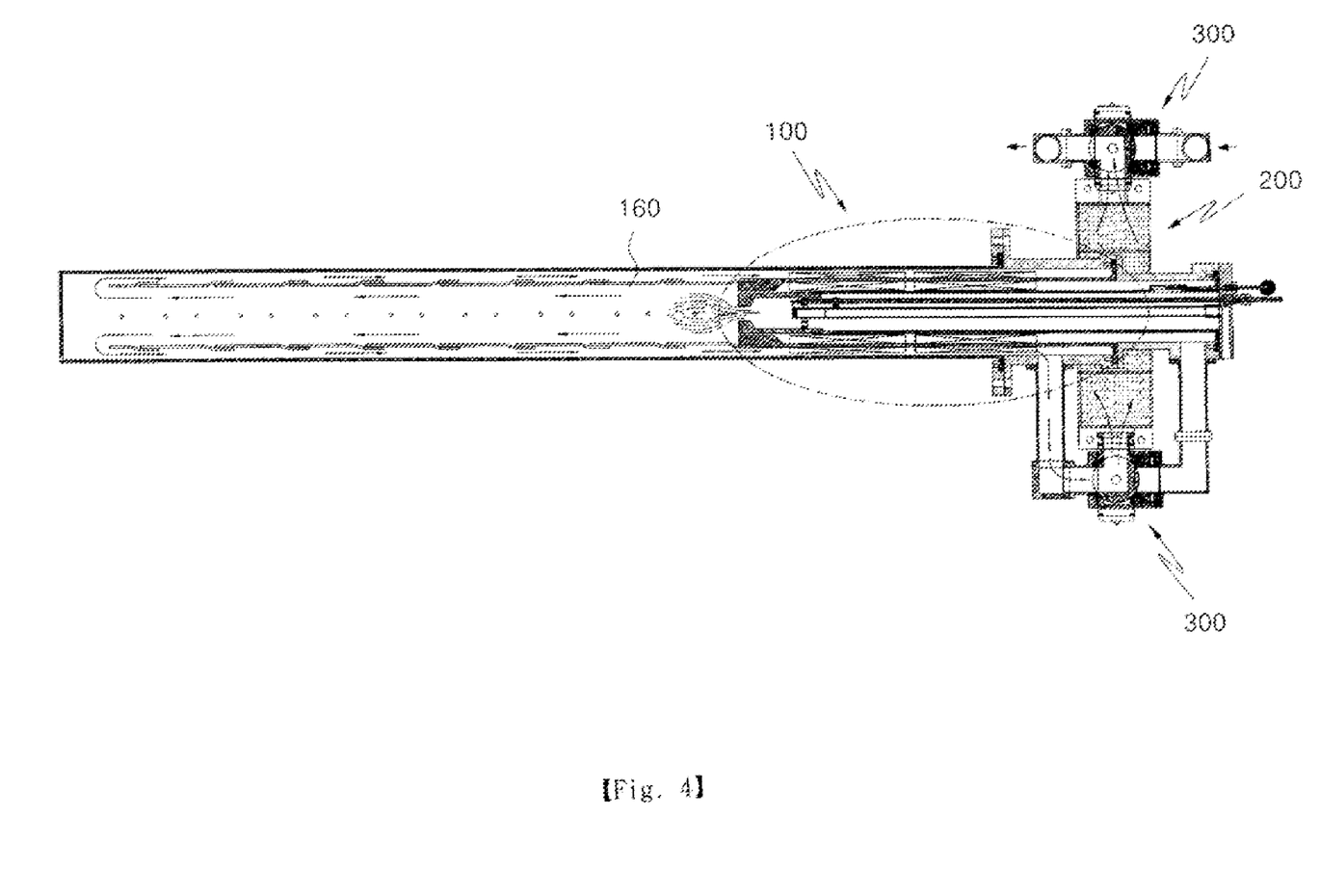
FIG. 4 is a cross-sectional view showing an entire structure of a full time regenerative type single radiant tube burner of the present invention.
Figure 5:
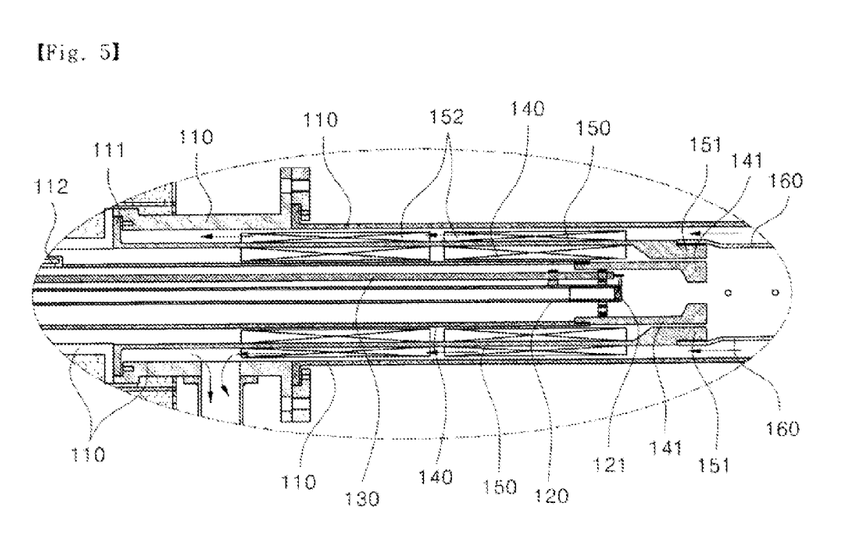
FIG. 5 is an enlarged view of main parts showing a burner structure of FIG. 4.
Figure 6:
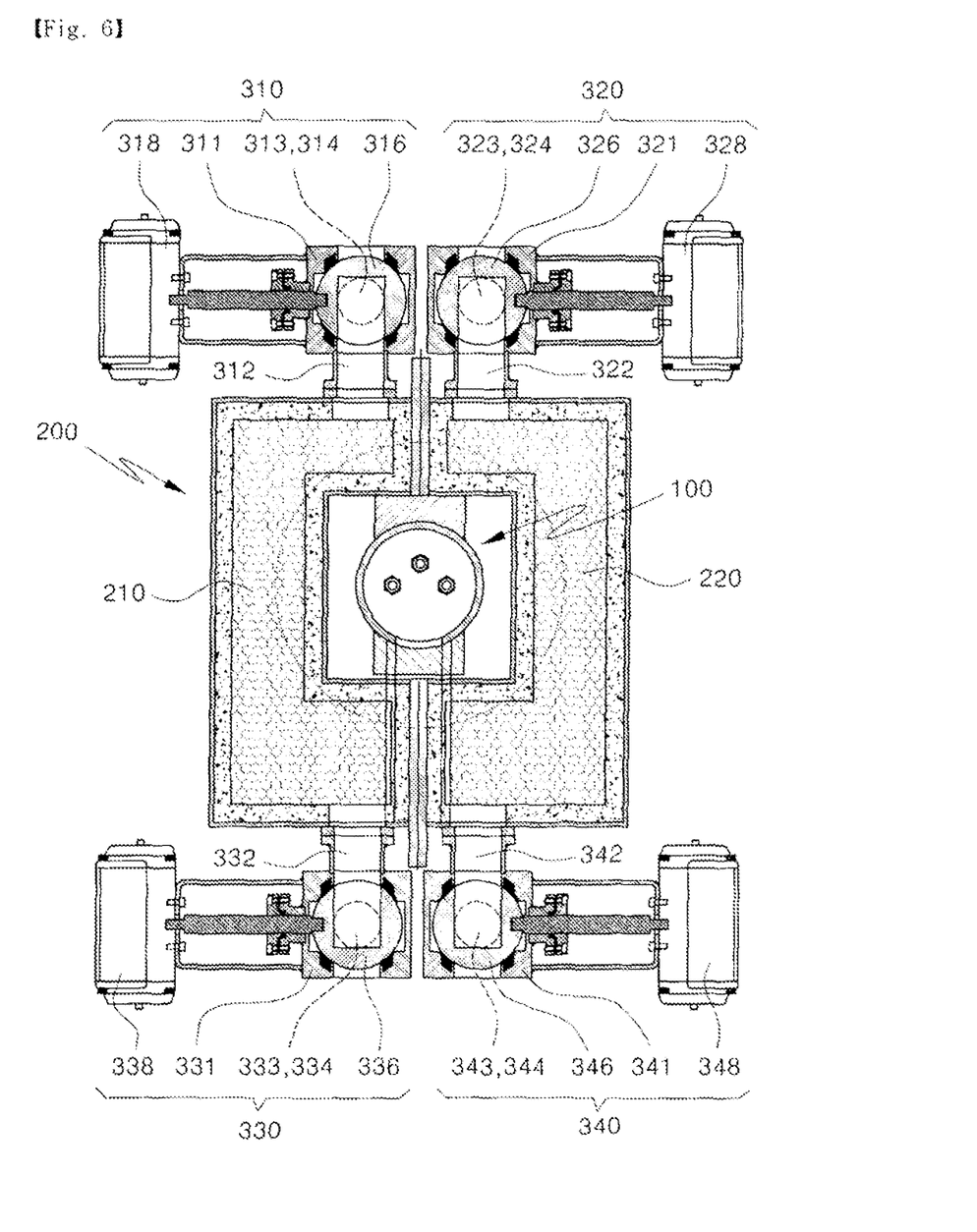
FIG. 6 is an enlarged side cross-sectional view of main parts showing a structure of an intake and exhaust switching device according to the present invention.
Figure 8:
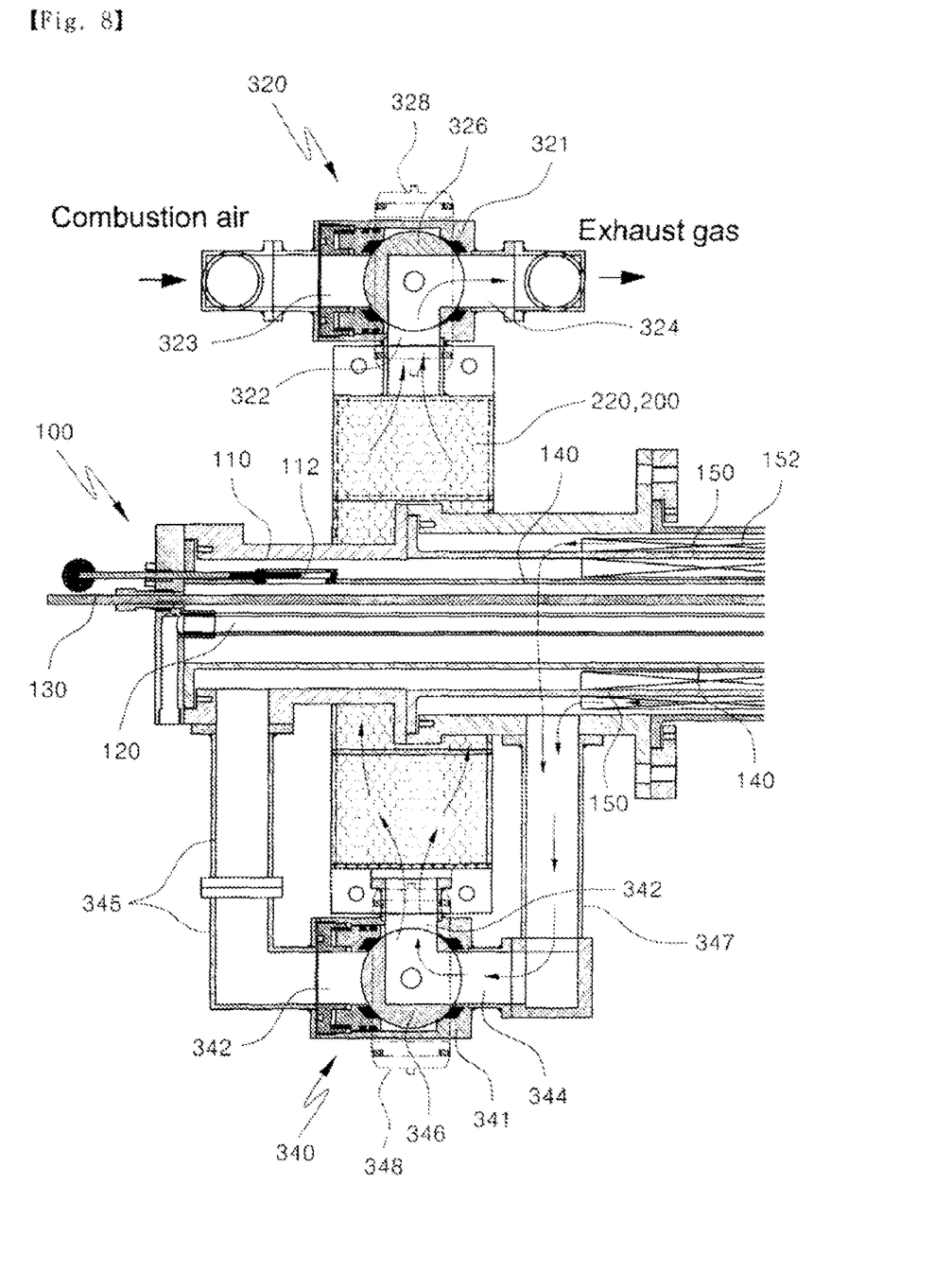
FIG. 8 is an enlarged front view of main parts showing an exhaust process of the intake and exhaust switching device according to the present invention.

FIG. 4 is a cross-sectional view showing an entire structure of a full time regenerative type single radiant tube burner of the present invention, FIG. 5 is an enlarged view of main parts of the burner structure of FIG. 4, FIG. 6 is an enlarged side cross-sectional view of main parts of an intake process of an intake and exhaust switching device according to the present invention, and FIG. 8 is an enlarged front view of main parts showing an exhaust process of the intake and exhaust switching process according to the present invention.

As shown in the drawings, the full time regenerative type single radiant tube burner of the present invention includes a radiant tube type burner 100, a regenerating unit 200 that regenerates the exhaust gas heat generated from the burner 100 and is used for preheating the intake combustion air, and an intake and exhaust switching device 300 that passes the intake air and the exhaust gas to the regenerating unit 200 and heat-exchanges them.

First describing the configuration of the burner 100, a burner body 110 of a closed space, which is flange-coupled with the intake and exhaust switching device 300, forms the outermost part and a gas injection tube 120, which is positioned at the center of the burner body 110 and has a plurality of gas nozzle holes 121 formed at an end thereof, is provided.

Further, an ignition rod 130 to be diagonally declined is longitudinally installed on the upper part of the gas injection tube 120, performs a role as an ignition device that provides embers to the burner.

Further, a combustion air supplying tube 140 in a cylindrical shape, which receives the gas injection tube 120 and the ignition rod 130, is included in the main body of the burner to inject air preheated from the regenerating unit 200.

At this time, one end of the combustion air supplying tube 140 is integrally formed with a preheating air nozzle tube 141.

In other words, as shown in FIG. 4, the exhaust gas is moved through the combustion air supplying tube 140 that is disposed in the burner body 110, which is a closed space, in the state where the end of the combustion air supplying tube is opened and is jet through the nozzle tube.

At this time, the high-temperature air and exhaust gas causes a result of supplying air to a pilot ember attached to the end of the gas injection end 120, such that the burner 100 of the present invention performs the long non-flame combustion that has almost no the deviation of temperature.

Further, a flames conserving tube 151 is integrally formed at the end, a heat exchanger tube 150 that receives the combustion air supplying tube 140 is configured, and an inner circumferential surface of the burner body 110 is coupled with a heat exchanger pin 152 that is formed to be surrounded in a circumferential direction at a predetermined interval between the heat exchanger tube 150 and the combustion air supplying tube 140.

Herein, in the present invention, the coupling of the heat exchanger tube 150 and the heat exchanger pin 152 is referred to as a heat exchanger for convenience.

The heat exchanger pin 152 rotates the exhaust gas formed in the tube 160 in a shown arrow direction when flame is emitted from the burner 100 and performs a role of preheating air for combustion that flows along the outer circumferential surface of the preheating air supplying tube 140 by conducting heat energy, when the exhaust gas passes through the heat-exchanger pin 152. This increases the utilization of waste heat to prevent the waste heat from being uselessly discharged to the outside of the burner 100 and to maximize the heat efficiency.

Moreover, as shown in FIG. 4, when the present invention is provided with a tube 160 that surrounds a part of the frame conserving tube 151 and is disposed forward to emit the frame, thereby combusting the frame in the tube 160.

The present invention primarily transfers the heat energy of the exhaust gas from the burner 100 to the supply air for combustion through the heat exchanger tube 150, while the outside of the burner 100 is installed with the regenerating unit 200 to maximize the utilization of the waste heat.

The regenerating unit 200 is formed in a structure that a first regenerating chamber 210 and a second regenerating chamber 220 each having an independent channel are installed at both sides of the burner 100. At this time, the inside of the first regenerating chamber 210 and the second regenerating chamber 220 is filled with an absorption body that absorbs heat.

The regenerating unit 200 alternately provides the moving path of the exhaust gas and the intake air to supply the energy of the regenerated exhaust gas to the burner 100 again and the movement of the intake air and the exhaust gas is controlled through the intake and exhaust switching device 300.

The configuration of the intake and exhaust switching device 300 will be described below.

The intake and exhaust switching device includes: a first driver 310 that supplies external injection air to a first regenerating chamber 210 or discharges the exhaust gas heat-exchanged in the first regenerating chamber 210 to the outside; a second driver 320 that supplies the external injection air to a second regenerating chamber 220 or discharges the exhaust gas heat-exchanged in the second regenerating chamber 220 to the outside; a third driver 330 that supplies the intake air preheated in the first regenerating chamber 210 to the burner 100 side or supplies the exhaust gas combusted in the burner 100 to the first regenerating chamber 210; and a fourth driver 340 that supplies the intake air preheated in the second regenerating chamber 220 to the burner 100 side or supplies the exhaust gas combusted in the burner 100 to the second regenerating chamber 220.

Describing the configuration of the first driver 310, it is configured to include a first valve body 311 that has a three-way channel; a first variable channel 316 that is installed at the center of the valve body 311 and optionally interrupts or change the internal channel; and a first actuator 318 that shaft-connects the first variable channel 316 to be rotatably operated.

Herein, the first valve body 311 forms a first main path 312 that is connected to the first regenerating chamber 210 and a first combustion air path 313 and a first exhaust gas path 314 that are branched to both sides from the first main path 312.

At this time, the first variable channel 316 is manufactured in a spherical shape and forms a channel bent in a 90° direction therein.

The first variable channel 316 is shaft-connected to the first actuator 318 and rotates in a 90° direction left and right to connect the channel between the first main path 312 and the first combustion air path 313 or the channel between the first main path 312 and the first exhaust gas path 314.

At this time, as the first actuator 318 a hydraulic cylinder or a motor may be used.

Describing the configuration of the first driver 320, it is configured to include a second valve body 321 that has a three-way channel; a second variable channel 326 that is installed at the center of the second valve body 321 and optionally interrupts or change the internal channel; and a second actuator 328 that shaft-connects the variable channel 328 to be rotatably operated.

Herein, the second valve body 321 forms a second main path 322 that is connected to the second regenerating chamber 220 and a second combustion air path 323 and a second exhaust gas path 324 that are branched to both sides from the second main path 322.

At this time, the second variable channel 326 is manufactured in a spherical shape and forms a channel bent in a 90° direction therein.

The second variable channel 326 is shaft-connected to the second actuator 328 and rotates in a 90° direction left and right to connect the channel between the second main path 322 and the second combustion air path 323 or the channel between the second main path 322 and the second exhaust gas path 324.

At this time, as the second actuator 328 a hydraulic cylinder or a motor may be used.

Describing the configuration of the third driver 330, it is configured to include a third valve body 331 that has a three-way channel; a third variable channel 336 that is installed at the center of the third valve body 331 and optionally interrupts or change the internal channel; and a third actuator 338 that shaft-connects the third variable channel 336 to be rotatably operated.

Herein, the third valve body 331 forms a third main path 332 that is connected to the first regenerating chamber 210 and a third combustion air path 333 and a third exhaust gas path 334 that are branched to both sides from the third main path 332.

At this time, the second variable channel 336 is manufactured in a spherical shape and forms a channel bent in a 90° direction therein.

The third variable channel 336 is shaft-connected to the third actuator 338 and rotates in a 90° direction left and right to connect the channel between the third main path 332 and the third combustion air path 333 or the channel between the third main path 332 and the third exhaust gas path 334.

At this time, the third combustion air path 333 is connected to the rear end side of the burner body 110 by using a third combustion air connection tube 335 and the third exhaust gas path 334 is connected to the front end side of the burner body 110 using a third exhaust gas connection tube 337.

As the third actuator 338 a hydraulic cylinder or a motor may be used.

Describing the configuration of the fourth driver 340, it is configured to include a fourth valve body 341 that has a three-way channel; a fourth variable channel 346 that is installed at the center of the fourth valve body 341 and optionally interrupts or change the internal channel; and a fourth actuator 348 that shaft-connects the fourth variable channel 346 to be rotatably operated.

Herein, the fourth valve body 341 forms a fourth main path 342 that is connected to the first regenerating chamber 220 and a fourth combustion air path 343 and a fourth exhaust gas path 344 that are branched to both sides from the fourth main path 342.

At this time, the fourth variable channel 346 is manufactured in a spherical shape and forms a channel bent in a 90° direction therein.

The fourth variable channel 346 is shaft-connected to the fourth actuator 348 and rotates in a 90° direction left and right to connect the channel between the fourth main path 342 and the fourth combustion air path 343 or the channel between the fourth main path 342 and the fourth exhaust gas path 344.

At this time, the fourth combustion air path 343 is connected to the rear end side of the burner body 110 by using a fourth combustion air connection tube 345 and the fourth exhaust gas path 344 is connected to the front end side of the burner body 110 using a fourth exhaust gas connection tube 347.

As the fourth actuator 348 a hydraulic cylinder or a motor may be used.

The burner combustion operation of the present invention having the above-mentioned configuration will be described below.

Referring to FIGS. 4 and 5, gas is supplied through the gas injection tube 120 of the burner 100 and the burner 100 forms the flame by the ignition spark of the ignition rod 130.

The flame is combusted to discharge the high-temperature exhaust gas and moves through the shown tube 160.

As shown in FIG. 4, the exhaust gas that reaches the end rotates in an arrow direction to progress along a path between the burner body 110 and the outer circumferential surface of the tube 160 and then performs the heat exchange while passing through the heat exchanger pin 152 that is the heat exchanger. In other words, the high-temperature heat for preheating the air for combustion is regenerated in the heat exchanger pin 152.

The exhaust gas, which passes through the heat exchanger, is transferred to the regenerating unit 200 in the state where it includes some heat energy and is regenerated by the heat exchange in the first regenerating chamber 210 and the second regenerating chamber 220 and is then discharged to the outside.

At this time, the exhaust gas is alternately supplied to the first regenerating chamber 210 or the second regenerating chamber 220 according to a control mode of the intake and exhaust switching device 300.

The operation of the intake and exhaust switching device 300 of the present invention will be described with reference to FIGS. 7 and 8.

First, the intake and exhaust switching device 300 of the present invention simultaneously operates two intake and exhaust systems that are separated into the first regenerating chamber 310 and the second regenerating chamber 220.

In other words, it is operated as a first intake and exhaust system that is connected by the first driver 310, the first regenerating chamber 210, and the third driver 330 and a second intake and exhaust system that is connected by a second driver 320, a second regenerating chamber 220, and a fourth driver 340.

At this time, each of the first and second intake and exhaust systems repeatedly performs the separate intake/exhaust process alternately. After the intake process, the channel is changed to perform the exhaust process and after the exhaust process, the channel is again changed to perform the intake process.

As described above, the present invention alternately controls the intake and exhaust process of the first intake and exhaust system and the second intake and exhaust system, such that the full time combustion is performed without stopping the combustion timing of the burner 100.

In other words, the exhaust process is performed in the second intake and exhaust system while the intake process is performed in the first intake and exhaust system and the intake process is performed in the second intake and exhaust system while the exhaust process is performed in the first intake and exhaust system, such that the supply of the combustion air to the burner 110 and the exhaust gas emitting process are simultaneously performed continuously, thereby making it possible to perform the full time combustion.

Figure 7:
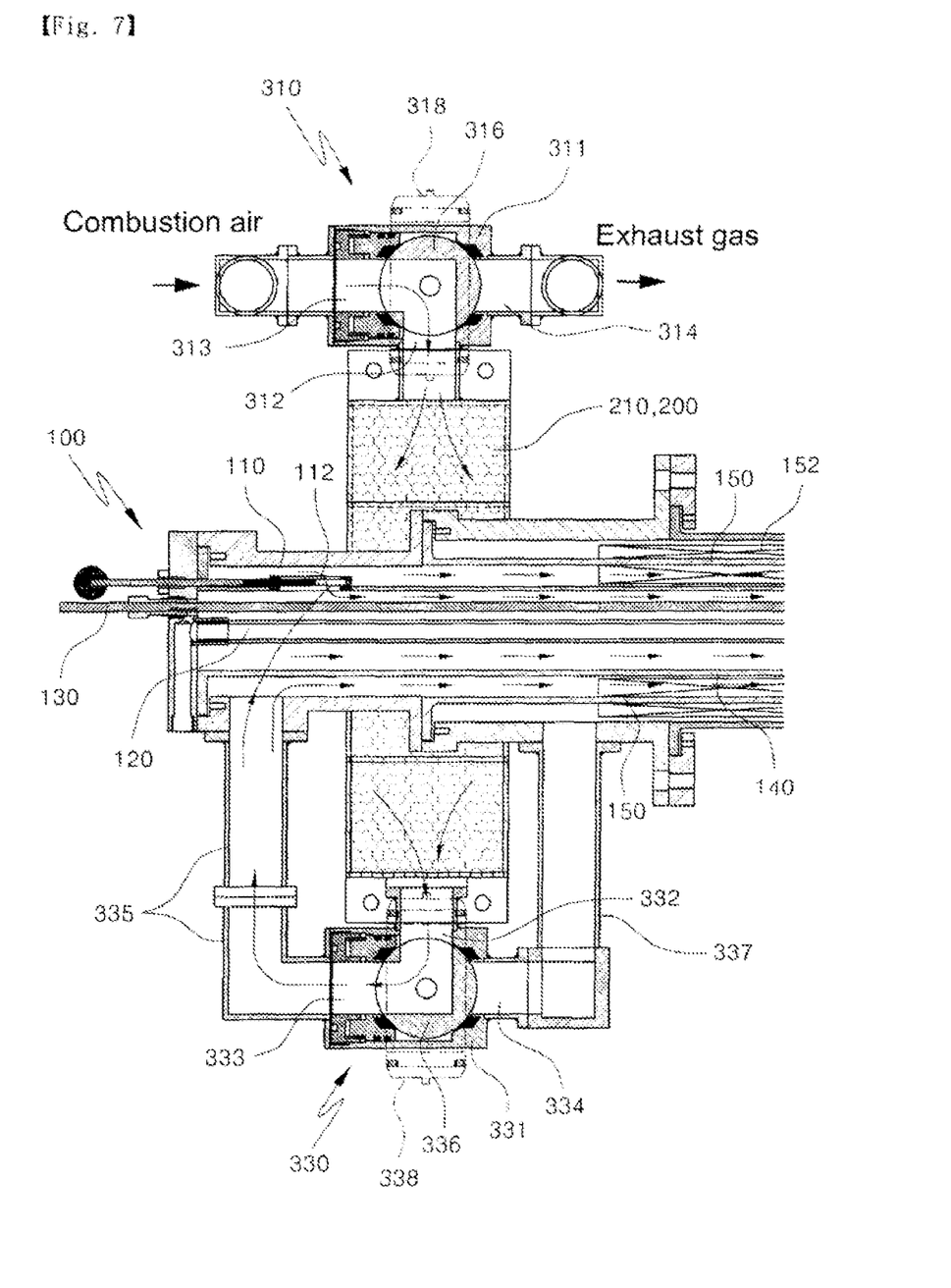
FIG. 7 is an enlarged front view of main parts showing an intake process of the intake and exhaust switching device according to the present invention.

FIG. 7 is an enlarged front view of main parts showing the intake process of the intake and exhaust switching device according to the present invention and shows the intake process by the first intake and exhaust system that is connected by the first driver 310, the first regenerating chamber 210, and the third driver 330.

FIG. 8 is an enlarged front view of main parts showing the exhaust process of the intake and exhaust switching device according to the present invention and shows the exhaust process by the second intake and exhaust system that is connected by the second driver 320, the second regenerating chamber 220, and the fourth driver 340.

In the state where the above-mentioned intake and exhaust processes of FIGS. 7 and 8 are simultaneously performed, the combustion air of FIG. 7 is supplied to the first driver 310, the first regenerating chamber 210, the third driver 330, the third combustion air connection tube 335, the burner body 110, and the combustion air supplying tube 140, while the exhaust gas of FIG. 8 is emitted to the air through the heat exchanger tube 150, the fourth exhaust gas connection tube 347, the fourth driver 340, the second regenerating chamber 220, and the second driver 320.

Thereafter, each of the first intake and exhaust system and the second intake and exhaust system is alternately operated by performing the intake and exhaust process reversely.

To this end, the first, second, third, and fourth actuators 318, 328, 338, and 348 of the first driver 310, the second driver 320, the third driver 330, and the fourth driver 340 are operated to rotate the first, second, third, and fourth variable channels 316, 325, 336, and 346 in a 90° direction, thereby change the channel.

Then, the intake/exhaust process is performed by the switched channel and the operation thereof is preformed in reverse order with respect to order described in FIGS. 7 and 8.

The present invention having the above-mentioned configuration and operation can perform the full time combustion using the single radiant tube burner to maximize the combustion efficiency, thereby improve the energy efficiency, while the present invention makes the structure of the intake and exhaust switching device 300 simple, can compactly design the burner by mounting the regenerating unit 200, which is integrated with the intake and exhaust switching device, to surround the circumference of the burner body 110 and can manufacture the burner at a small size, such that it can be applied to various environments without limiting the installation space.

What is claimed is:

1. A full time regenerative type single radiant tube burner, comprising:
   a radiant tube type burner;
   a regenerating unit that regenerates exhaust gas heat generated from the burner and is used for preheating the intake combustion air; and
   an intake and exhaust switching device that passes the intake air and the exhaust gas to the regenerating unit and heat-exchanges them and simultaneously progresses the intake and exhaust processes of the burner to perform the full time combustion,
   wherein the intake and exhaust switching device includes:
   a first driver that supplies external injection air to a first regenerating chamber or discharges the exhaust gas heat-exchanged in the first regenerating chamber to the outside;
   a second driver that supplies the external injection air to a second regenerating chamber or discharges the exhaust gas heat-exchanged in the second regenerating chamber to the outside;
   a third driver that supplies the intake air preheated in the first regenerating chamber to the burner side or supplies the exhaust gas combusted in the burner to the first regenerating chamber; and
   a fourth driver that supplies the intake air preheated in the second regenerating chamber to the burner side or supplies the exhaust gas combusted in the burner to the second regenerating chamber.

2. The full time regenerative type single radiant tube burner according to claim 1, wherein the regenerating unit includes a first regenerating chamber and a second regenerating chamber each having an independent channel at both sides of the burner.

3. The full time regenerative type single radiant tube burner according to claim 1, wherein at least one of the first driver, the second driver, the third driver, and the fourth driver includes:
   a valve body that has a three-way channel;
   a variable channel that is installed at the center of the valve body and optionally interrupts or change the internal channel; and an actuator that shaft-connects the variable channel to be rotatably operated.

4. The full time regenerative type single radiant tube burner according to claim 3, wherein when the driver is the first driver, the first driver includes:
a first valve body that has a three-way channel;
a first variable channel that is installed at the center of the valve body and optionally interrupts or change the internal channel; and
a first actuator that shaft-connects the first variable channel to be rotatably operated,
the first valve body forming a first main path that is connected to the first regenerating chamber and a first combustion air path and a first exhaust gas path that are branched to both sides from the first main path.

5. The full time regenerative type single radiant tube burner according to claim 3, wherein when the driver is the second driver, the second driver includes:
a second valve body that has a three-way channel;
a second variable channel that is installed at the center of the second valve body and optionally interrupts or change the internal channel; and
a second actuator that shaft-connects the variable channel to be rotatably operated
the second valve body forming a second main path that is connected to the second regenerating chamber and a second combustion air path and a second exhaust gas path that are branched to both sides from the second main path.

6. The full time regenerative type single radiant tube burner according to claim 3, wherein when the driver is the third driver, the third driver includes:
a third valve body that has a three-way channel;
a third variable channel that is installed at the center of the third valve body and optionally interrupts or change the internal channel; and
a third actuator that shaft-connects the third variable channel to be rotatably operated,
the third valve body forming a third main path that is connected to the first regenerating chamber and a third combustion air path and a third exhaust gas path that are branched to both sides from the third main path.

7. The full time regenerative type single radiant tube burner according to claim 6, wherein the third combustion air path is connected to the rear end side of a burner body by using a third combustion air connection tube and the third exhaust gas path is connected to the front end side of the burner body using a third exhaust gas connection tube.

8. The full time regenerative type single radiant tube burner according to claim 3, wherein when the driver is the fourth driver, the fourth driver includes:
a fourth valve body that has a three-way channel;
a fourth variable channel that is installed at the center of the fourth valve body and optionally interrupts or change the internal channel; and
a fourth actuator that shaft-connects the fourth variable channel to be rotatably operated,
the fourth valve body forming a fourth main path that is connected to the first regenerating chamber and a fourth combustion air path and a fourth exhaust gas path that are branched to both sides from the fourth main path.

9. The full time regenerative type single radiant tube burner according to claim 8, wherein the fourth combustion air path is connected to the rear end side of a burner body by using a fourth combustion air connection tube and the fourth exhaust gas path is connected to the front end side of the burner body using a fourth exhaust gas connection tube.

10. The full time regenerative type single radiant tube burner according to claim 3, wherein the variable channel is manufactured in a spherical shape.

* * * * *